US012204261B2

(12) United States Patent
Katagiri

(10) Patent No.: US 12,204,261 B2
(45) Date of Patent: Jan. 21, 2025

(54) IMAGE FORMING APPARATUS WITH TONER STORAGE

(71) Applicant: Konica Minolta Inc., Tokyo (JP)

(72) Inventor: Tatsuya Katagiri, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/307,506

(22) Filed: Apr. 26, 2023

(65) Prior Publication Data

US 2023/0350324 A1 Nov. 2, 2023

(30) Foreign Application Priority Data

Apr. 28, 2022 (JP) ................................ 2022-075039

(51) Int. Cl.
*G03G 15/08* (2006.01)

(52) U.S. Cl.
CPC ..... *G03G 15/0856* (2013.01); *G03G 15/0865* (2013.01)

(58) Field of Classification Search
USPC ........................................................ 399/61
See application file for complete search history.

(56) References Cited

U.S. PATENT DOCUMENTS

2016/0209775 A1* 7/2016 Watanabe .......... G03G 15/0812

FOREIGN PATENT DOCUMENTS

| | | | |
|---|---|---|---|
| JP | 2005024622 | A | 1/2005 |
| JP | 2007114429 | A | 5/2007 |
| JP | 2010217386 | A | 9/2010 |
| JP | 2014178426 | A | 9/2014 |
| JP | 2016114735 | A | 6/2016 |
| JP | 2017116649 | A | 6/2017 |
| JP | 2020154015 | A | 9/2020 |
| JP | 2021184023 | A | 12/2021 |

OTHER PUBLICATIONS

JPO Notice of Reasons for Refusal for corresponding JP Application No. 2022-075039; Issued on Dec. 5, 2023.
JPO Notice of Reasons for Refusal for corresponding JP Application No. 2022-075039; Mailing Date, Sep. 5, 2023.

* cited by examiner

*Primary Examiner* — Quana Grainger
(74) *Attorney, Agent, or Firm* — CANTOR COLBURN LLP

(57) ABSTRACT

An image forming apparatus capable of forming a toner image on continuous paper, includes: a developing device that develops a latent image formed on an image carrier to form a toner image; a toner storage container that stores toner and is detachably attached to the image forming apparatus; and a plurality of toner storages, wherein the toner is supplied from the toner storage container to the developing device via the plurality of toner storages.

17 Claims, 8 Drawing Sheets

IMAGE FORMING APPARATUS WITH TONER STORAGE

CROSS REFERENCES TO RELATED APPLICATIONS

The present invention claims priority under 35 U.S.C. § 119 to Japanese Application, 2022-075039, filed on Apr. 28, 2022, the entire contents of which being incorporated herein by reference.

BACKGROUND

Technological Field

The present invention relates to an image forming apparatus, and especially relates to an image forming apparatus that forms a toner image on a continuous recording medium.

Description of the Related Art

An image forming apparatus that forms a toner image of toner on paper is known. For example, an image forming apparatus disclosed in Japanese Patent Application Laid-Open No. 2016-114735 A includes a developing device that forms a toner image on paper, and a toner bottle that contains toner used by the developing device to form the toner image is detachably attached thereto. A toner hopper is provided between the developing device and the toner bottle, and the toner contained in the toner bottle is supplied to the developing device via the toner hopper.

The toner hopper supplies a necessary amount of toner to the developing device. In this toner hopper, ability to convey the toner and ability to stir the toner are determined from the viewpoint of space saving and power saving, and a capacity is smaller than that of the toner bottle. For example, in this document, the capacity of the toner bottle is 1,000 g, whereas the capacity of the toner hopper is 30 g.

In contrast, in the image forming apparatus, there is a request for continuous printing on roll paper obtained by winding paper continuous in one direction around a shaft (for example, JP 2020-154015 A). In a case of forming an image on the roll paper, the toner is continuously consumed by the developing device. Therefore, it is necessary to continuously accumulate a necessary amount of toner in the developing device and the toner hopper. In the conventional image forming apparatus, in a case where the toner stored in the toner bottle or the toner hopper runs out while the image is continuously formed on the roll paper, the image forming apparatus stops. In a case where the image forming apparatus stops, image formation should be restarted after a user replaces the toner bottle with a new one. Therefore, productivity of the image forming apparatus decreases. In order to continue the image formation without stopping the image forming apparatus, the user always has to check a remaining amount of the toner contained in the toner bottle and replace the toner bottle before the toner runs out. Therefore, the user has additional work to replace the toner bottle. In order to reduce the number of times of replacement work of the toner bottle, it is conceivable to increase a toner capacity storable in the toner bottle, but since a size of the toner bottle increases, a space for storing a spare toner bottle increases, and a cost of delivering the toner bottle increases. When a weight of the toner bottle increases, it becomes difficult to replace the toner bottle.

SUMMARY

The present invention has been made to solve the above-described problems, and an object of the present invention is to provide an image forming apparatus capable of continuously forming a toner image on continuous paper without lowering productivity.

To achieve the abovementioned object, according to an aspect of the present invention, there is provided an image forming apparatus capable of forming a toner image on continuous paper, and the image forming apparatus reflecting one aspect of the present invention comprises: a developing device that develops a latent image formed on an image carrier to form a toner image; a toner storage container that stores toner and is detachably attached to the image forming apparatus; and a plurality of toner storages, wherein the toner is supplied from the toner storage container to the developing device via the plurality of toner storages.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, an image forming apparatus according to one or more embodiments of the present invention will be described with reference to the drawings. However, the scope of the invention is not limited to the disclosed embodiments. In the following description, the same parts are assigned with the same reference signs. Their names and functions are also the same. Therefore, detailed description thereof is not repeated.

Figure 1:
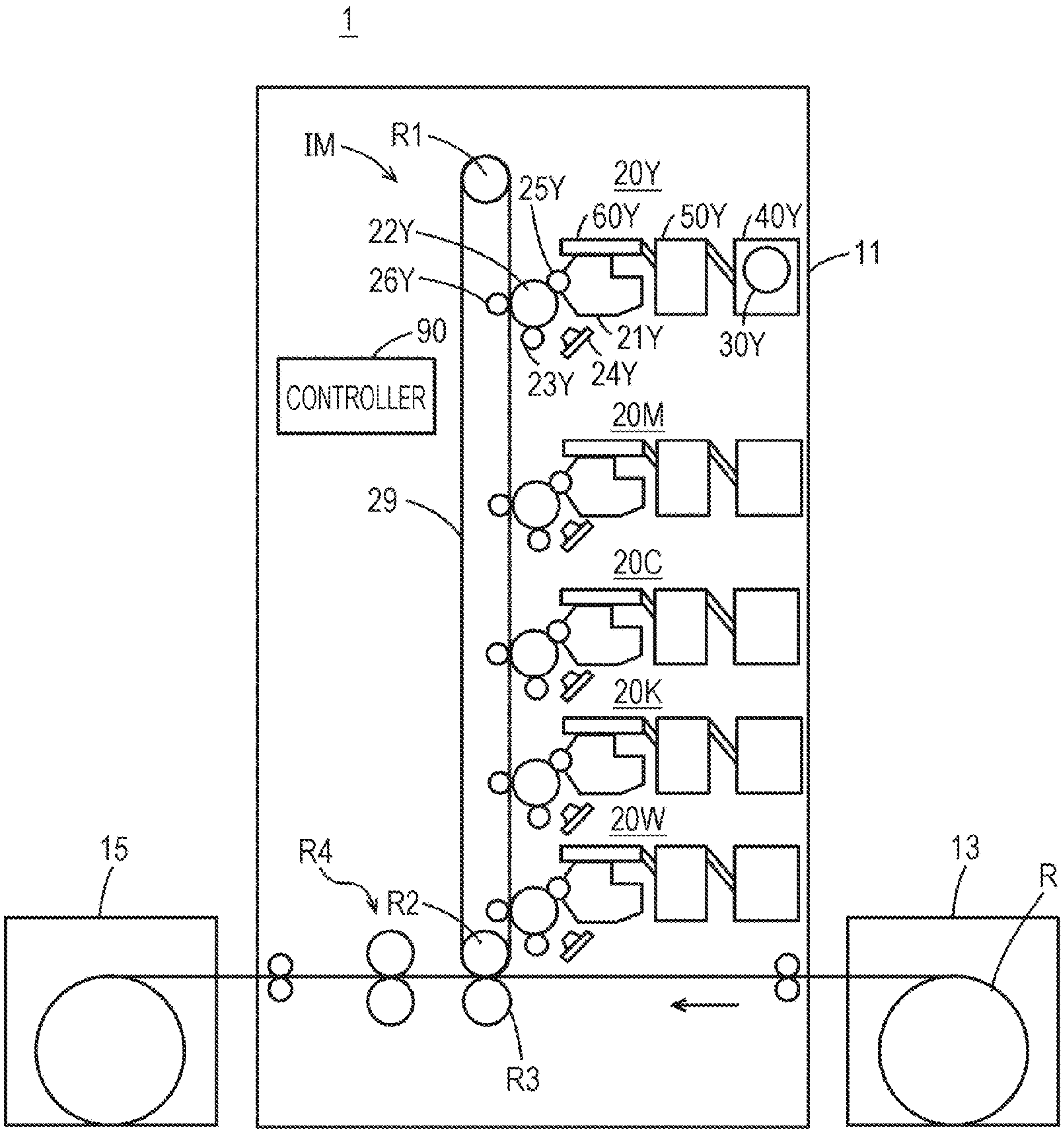
FIG. 1 is a view illustrating an example of a schematic internal configuration of an image forming apparatus in an embodiment of the present invention.

FIG. 1 is a view illustrating an example of a schematic internal configuration of an image forming apparatus in an embodiment of the present invention. In FIG. 1, members required for describing the present invention are illustrated, and the image forming apparatus of the present invention is not limited to the example illustrated in FIG. 1. With reference to FIG. 1, An image forming apparatus 1 includes a main body 11, a paper feeding device 13, and a winding device 15. The paper feeding device 13 is arranged at a preceding stage of the main body 11, and the winding device 15 is arranged at a subsequent stage of the main body 11. The paper feeding device 13 feeds roll paper R to the main body 11 in a conveyance direction indicated by an arrow in FIG. 1. The winding device 15 winds the roll paper R on which an image is formed by the main body 11. The roll paper R wound by the winding device 15 is processed by a post-processer (not illustrated). The post-processor cuts out, for example, a label image, a package image and the like formed on the roll paper R.

The main body 11 includes an image former IM and a controller 90. The controller 90 controls the image former IM. The controller 90 includes a central processing unit (CPU) and a memory and controls the image former IM by executing a program stored in the memory. The image former IM includes image forming units 20Y, 20M, 20C, 20K, and 20W corresponding to yellow, magenta, cyan, black, and white, respectively. Herein, "Y", "M", "C", "K", and "W" represent yellow, magenta, cyan, black, and white, respectively. When at least one of the image forming units 20Y, 20M, 20C, 20K, and 20W is driven, an image is formed. When all of the image forming units 20Y, 20M, 20C, 20K, and 20W are driven, a full-color image is formed. Printing data of yellow, magenta, cyan, black, and white are input to the image forming units 20Y, 20M, 20C, 20K, and 20W, respectively. The image forming units 20Y, 20M, 20C, 20K, and 20W are the same except for different colors of toner to be handled, so that the image forming unit 20Y for forming a yellow image is herein described.

The image forming unit 20Y includes a developing device 21Y, a photosensitive drum 22Y as an image carrier, a bottle storage 40Y to which a toner bottle 30Y is detachably attached, a first toner storage 50Y, and a second toner storage 60Y. The developing device 21Y includes a developing roller 25Y; the developing roller 25Y includes a built-in magnet roller and holds charged toner stored in the developing device 21Y by an action of a magnetic force. The photosensitive drum 22Y has a cylindrical shape, and a charging roller 23Y, an exposure device 24Y, the developing roller 25Y, and a primary transfer roller 26Y are sequentially arranged around the photosensitive drum 22Y in a rotation direction of the photosensitive drum 22Y.

The photosensitive drum 22Y is irradiated with laser light emitted by the exposure device 24Y after a surface thereof is charged by the charging roller 23Y. The exposure device 24Y exposes an image corresponding portion on the surface of the photosensitive drum 22Y to form an electrostatic latent image. As a result, the electrostatic latent image is formed on the photosensitive drum 22Y Subsequently, the developing device 21Y develops the electrostatic latent image formed on the photosensitive drum 22Y with toner. Specifically, the toner held by the developing roller 25Y is placed on the electrostatic latent image formed on the photosensitive drum 22Y by an action of an electric field force, so that a toner image is formed on the photosensitive drum 22Y The toner image formed on the photosensitive drum 22Y is transferred onto an intermediate transfer belt 29 as an image carrier by an action of an electric field force by the primary transfer roller 26Y.

The intermediate transfer belt 29 is suspended by a driving roller R1 and a driven roller R2 so as not to slack. When the driving roller R1 rotates clockwise in FIG. 1, the intermediate transfer belt 29 rotates clockwise in the drawing at a predetermined speed. As the intermediate transfer belt 29 rotates, the driven roller R2 rotates clockwise.

As a result, the image forming units 20Y, 20M, 20C, 20K, and 20W transfer the toner images onto the intermediate transfer belt 29 in this order. A timing at which each of the image forming units 20Y, 20M, 20C, 20K, and 20W transfers the toner image onto the intermediate transfer belt 29 is adjusted by detection of a reference mark attached to the intermediate transfer belt 29. As a result, yellow, magenta, cyan, black, and white toner images are superimposed on the intermediate transfer belt 29.

The toner image formed on the intermediate transfer belt 29 is transferred onto the roll paper R by an action of an electric field force by a secondary transfer roller R3. The roll paper R onto which the toner image is transferred is conveyed to a fixing roller pair R4 to be heated and pressurized. As a result, the toner is melted to be fixed to the roll paper R.

The image forming apparatus 1 drives all of the image forming units 20Y, 20M, 20C, and 20K in a case of forming a full-color image, but drives any one of the image forming units 20Y, 20M, 20C, 20K, and 20W in a case of forming a monochrome image. It is also possible to form an image by combining two or more of the image forming units 20Y, 20M, 20C, 20K, and 20W.

A terminal device such as a personal computer operated by a user is connected to the controller 90 via a network not illustrated. The controller 90 executes a job input from the terminal device and controls the image forming units 20Y, 20M, 20C, 20K, and 20W to form an image on the roll paper R. The job includes image data indicating images to be formed by the image forming units 20Y, 20M, 20C, 20K, and 20W, and includes image forming conditions for forming the image of the image data. The image forming conditions include a position where the image of the image data is arranged on the roll paper R, the number of images of the image data to be formed on the roll paper R and the like. In a case where the controller 90 executes the job, the controller 90 controls the image forming units 20Y, 20M, 20C, 20K, and 20W such that the image of the image data is formed under the image forming conditions defined by the job.

Figure 2:
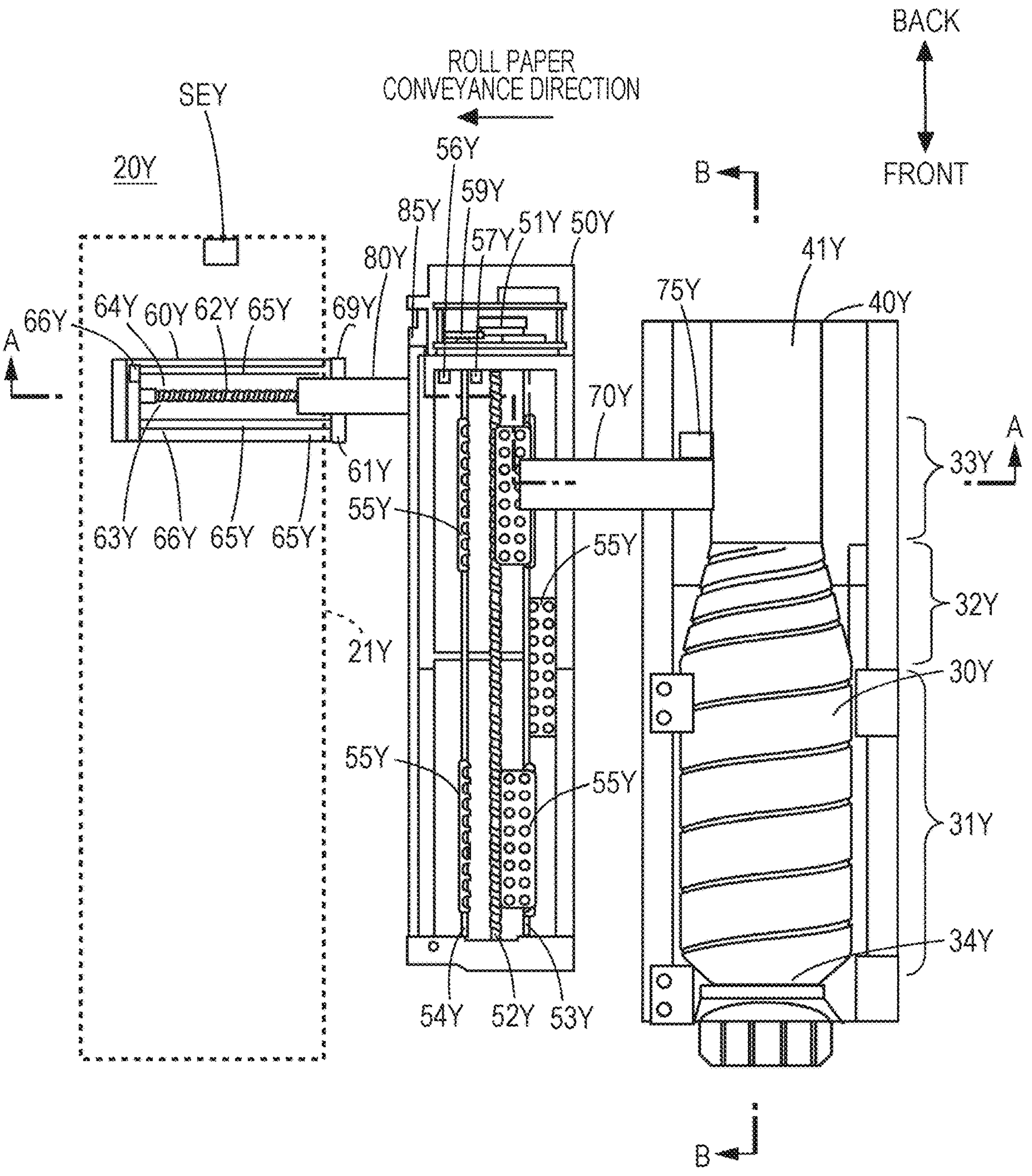
FIG. 2 is a plan view illustrating an internal configuration of an image forming unit.
Figure 3:
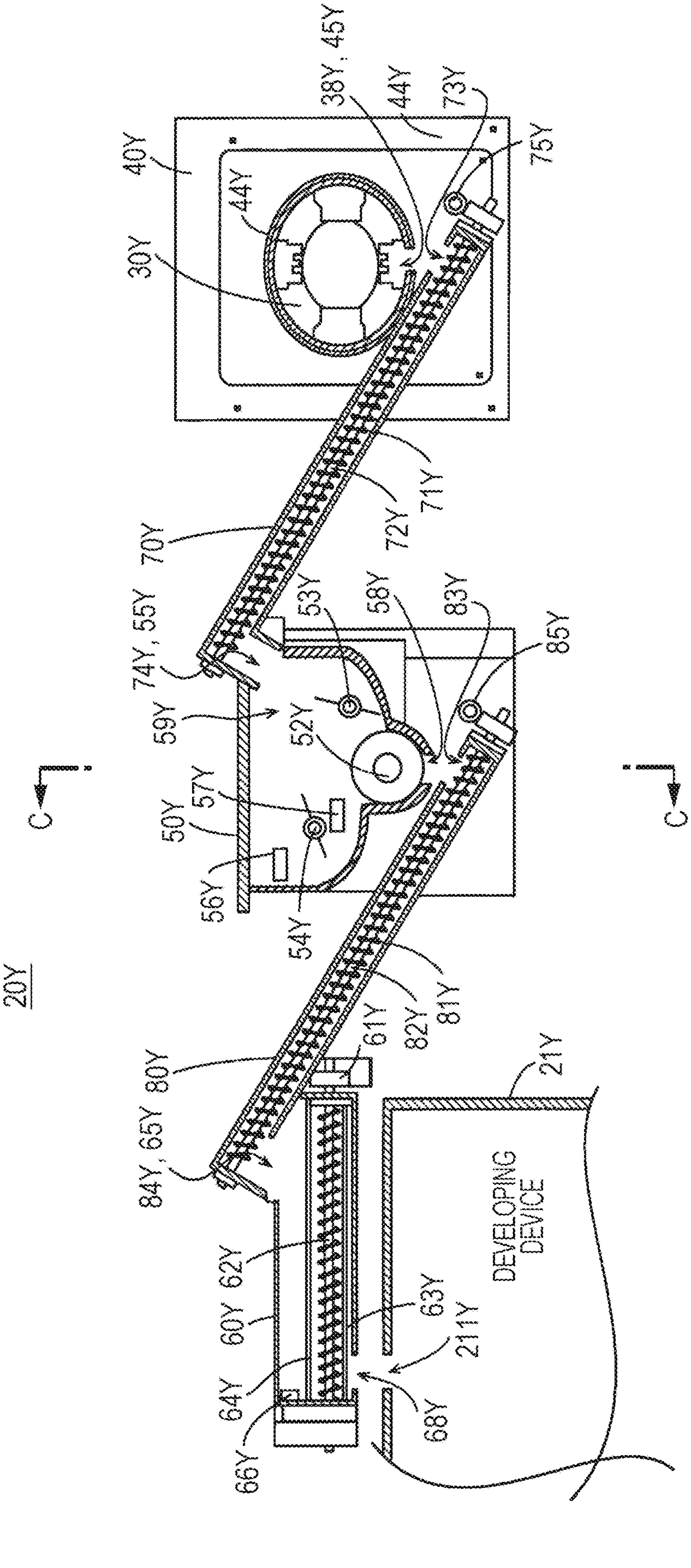
FIG. 3 is a cross-sectional view taken along line A-A in FIG. 2.
Figure 4:
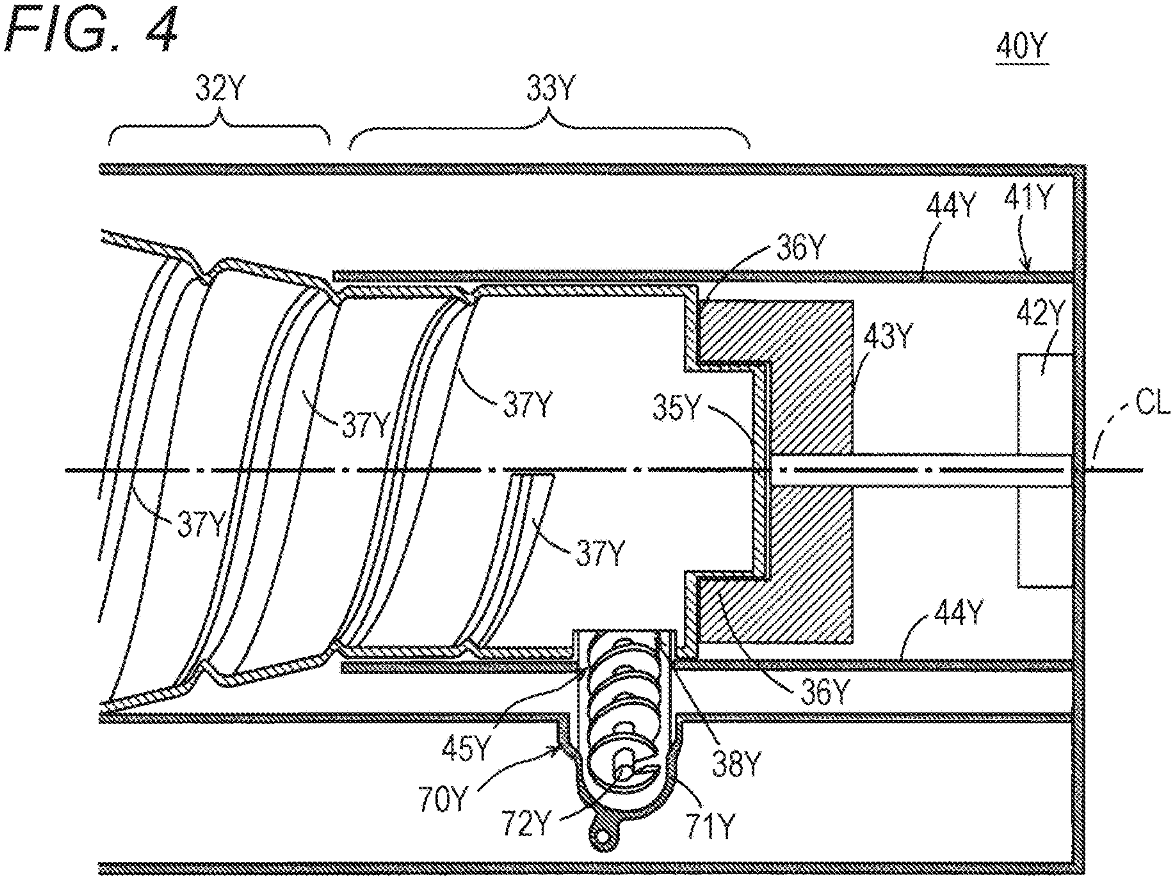
FIG. 4 is a view illustrating a part of a cross section taken along line B-B in FIG. 2.
Figure 5:
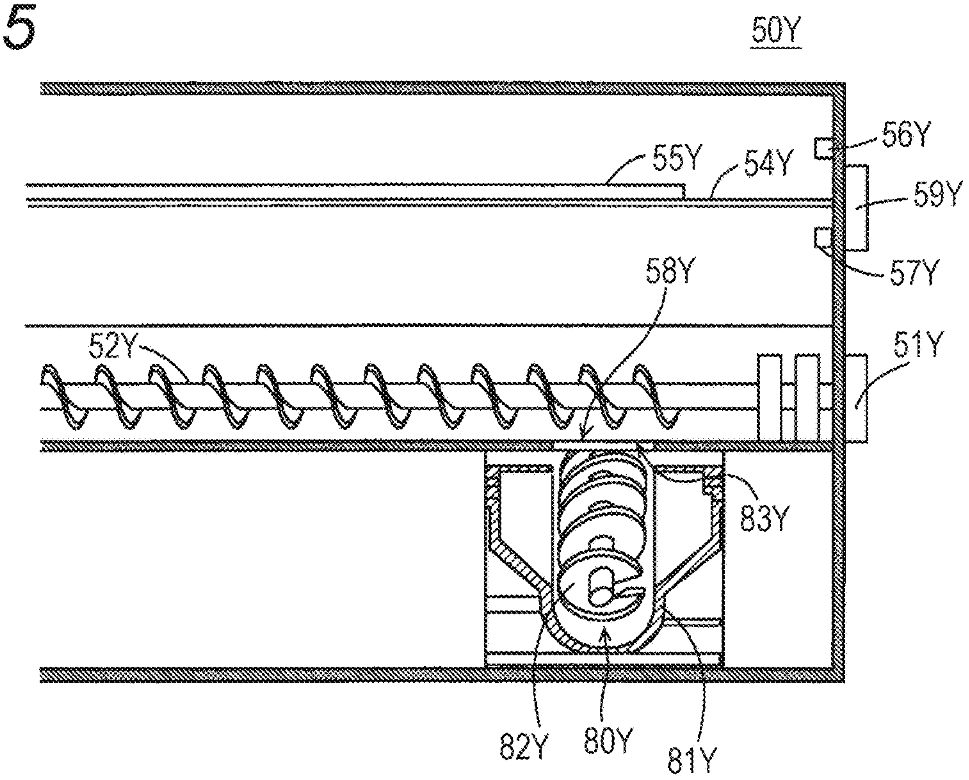
FIG. 5 is a view illustrating a part of a cross section taken along line C-C in FIG. 3.

FIG. 2 is a plan view illustrating an internal configuration of the image forming unit. FIG. 3 is a cross-sectional view taken along line A-A in FIG. 2. FIG. 4 is a view illustrating a part of a cross section taken along line B-B in FIG. 2. FIG. 5 is a view illustrating a part of a cross section taken along line C-C in FIG. 3. In FIGS. 2 to 5, some members are omitted to illustrate the internal configuration of the image forming unit 20Y. Hereinafter, for the sake of description, a direction orthogonal to the conveyance direction of the roll paper R is referred to as a front-back direction. A direction from a back surface toward a front surface is referred to as a direction to the front, and a direction from the front surface to the back surface is referred to as a direction to the back.

With reference to FIGS. 2 to 5, the image forming unit 20Y includes the bottle storage 40Y, the first toner storage 50Y, and the second toner storage 60Y. The bottle storage 40Y, the first toner storage 50Y, and the second toner storage 60Y are arranged in this order on a path through which the toner is conveyed. The bottle storage 40Y is arranged on a most upstream side, and the second toner storage 60Y is arranged on a most downstream side. The second toner storage 60Y is arranged immediately before the developing device 21Y. The toner is supplied from the second toner storage 60Y to the developing device 21Y via a toner conveyance path.

More specifically, the bottle storage 40Y, the first toner storage 50Y, and the second toner storage 60Y are arranged in this order in the conveyance direction of the roll paper R. The bottle storage 40Y and the first toner storage 50Y are connected to each other by a first conveyance path 70Y. The first toner storage 50Y and the second toner storage 60Y are connected to each other by a second conveyance path 80Y.

The bottle storage 40Y extends in a rectangular tube shape in one direction and is arranged such that a longitudinal direction thereof is horizontal and parallel to the front-back direction. The bottle storage 40Y includes an internal space in which the toner bottle 30Y can be stored. The bottle storage 40Y has an opening that opens the internal space to the outside on a side surface on a front side.

The toner bottle 30Y includes a body portion 31Y, a tapered portion 32Y, and a gripped portion 33Y The body portion 31Y extends in a substantially cylindrical shape and includes a bottom 34Y at one end. The tapered portion 32Y extends from the other end of the body portion 31Y toward the gripped portion 33Y so as to be gradually smaller in diameter. The gripped portion 33Y extends in a cylindrical shape from a tip end of the tapered portion 32Y and includes a ceiling 35Y at one end. A fitting groove 36Y is formed on the ceiling 35Y. An opening 38Y opened to the outside is formed in a cylindrically extending portion of the gripped portion 33Y.

An axial center of the toner bottle 30Y is referred to as a center line CL, and a direction orthogonal to the center line CL is referred to as a radial direction. In this example, the toner bottle 30Y is attached to the bottle storage 40Y in a state in which the center line CL is horizontal. The toner bottle 30Y includes an inner peripheral surface extending from the bottom 34Y toward the ceiling 35Y about the center line CL. The toner bottle 30Y includes a protrusion 37Y that protrudes inward from the inner peripheral surface and extends spirally about the center line CL from the bottom 34Y to the opening 38Y.

The bottle storage 40Y includes a bottle rotating mechanism 41Y. The bottle rotating mechanism 41Y includes a bottle motor 42Y, a gripping member 43Y, and a guide member 44Y. The guide member 44Y extends in a cylindrical shape and includes one end fixed to a side wall on a back side of the bottle storage 40Y in the internal space of the bottle storage 40Y. The other end side of the guide member 44Y forms an opening that opens an internal space of the guide member 44Y to the outside. On the guide member 44Y, an opening 45Y that opens the internal space of the guide member 44Y downward is formed in a portion extending in a cylindrical shape.

The bottle motor 42Y is fixed to the side wall on the back side of the bottle storage 40Y in the internal space of the guide member 44Y The gripping member 43Y is connected to a tip end of a rotating shaft of the bottle motor 42Y A fitting claw is formed on a surface on a front side of the gripping member 43Y.

The toner bottle 30Y is detachably attached to the bottle storage 40Y. The toner bottle 30Y is inserted from the opening on the front side of the bottle storage 40Y toward the internal space of the bottle storage 40Y in a horizontal state. The ceiling 35Y of the toner bottle 30Y enters the internal space of the bottle storage 40Y toward the back side. When the toner bottle 30Y further enters, the ceiling 35Y enters the internal space of the guide member 44Y, and the fitting claw formed on the gripping member 43Y fits into the fitting groove 36Y formed on the ceiling 35Y of the toner bottle 30Y.

A rotational force of the bottle motor 42Y is transmitted to the toner bottle 30Y in a state in which the fitting claw formed on the gripping member 43Y is fitted into the fitting groove 36Y. Therefore, the bottle motor 42Y rotates the toner bottle 30Y. An inner diameter of the guide member 44Y is set to be equal to or slightly larger than an outer diameter of the gripped portion 33Y of the toner bottle 30Y As a result, the toner bottle 30Y rotates while sliding on an inner peripheral surface of the guide member 44Y, so that the toner bottle 30Y can be smoothly rotated about the center line CL thereof.

Positions of the opening 45Y formed on the guide member 44Y and the opening 38Y formed on the gripped portion 33Y of the toner bottle 30Y are determined such that distances in a horizontal direction from the side wall on the back side of the bottle storage 40Y become the same in a state in which the fitting claw formed on the gripping member 43Y is fitted into the fitting groove 36Y.

The first conveyance path 70Y conveys the toner supplied from the toner bottle 30Y to the first toner storage 50Y The first conveyance path 70Y includes a tubular member 71Y, a first conveyance screw 72Y, and a first conveyance motor 75Y. The first conveyance motor 75Y is a DC motor. Therefore, a cost of the first conveyance motor 75Y can be reduced. The tubular member 71Y has a shape extending in a tube shape in the conveyance direction of the roll paper R and in an upward direction and includes one end arranged below the guide member 44Y and the other end positioned above the first toner storage 50Y. On the tubular member 71Y, a first reception port 73Y is formed as an opening that opens an internal space thereof upward at a lower position facing the opening 45Y formed on the guide member 44Y. Therefore, the opening 45Y and the first reception port 73Y overlap with each other in plan view. A gap is formed between the opening 45Y formed on the guide member 44Y and the first reception port 73Y formed on the tubular member 71Y On the tubular member 71Y, a first supply port 74Y, which is an opening that opens the internal space thereof downward, is formed at an end on a side opposite to the end at which the first reception port 73Y is formed.

On the toner bottle 30Y, the protrusion 37Y extending spirally about the center line CL is formed on the inner peripheral surface thereof. Therefore, when the toner bottle 30Y is rotated by the bottle rotating mechanism 41Y, the toner in the toner bottle 30Y is conveyed backward by the protrusion 37Y A part of the toner that reaches the gripped portion 33Y is discharged to the outside from the opening 38Y formed on the gripped portion 33Y The toner discharged from the opening 38Y falls into the internal space of the tubular member 71Y via the opening 45Y formed on the guide member 44Y, the gap, and the first reception port 73Y formed on the tubular member 71Y.

The first conveyance screw 72Y includes a rotating shaft extending in one direction and a blade, which is a protrusion extending spirally from one end to the other end about an axial center of the rotating shaft. The first conveyance screw 72Y is rotatably stored in the internal space of the tubular member 71Y such that the axial center thereof overlaps with an axial center of the tubular member 71Y. An outer diameter of the first conveyance screw 72Y is the same as or slightly smaller than an inner diameter of the tubular member 71Y The first conveyance screw 72Y is connected to a first conveyance motor 75Y via a gear, and a rotational force of the first conveyance motor 75Y is transmitted to the first conveyance screw 72Y.

When the first conveyance screw 72Y is rotated by the first conveyance motor 75Y, the toner received from the first reception port 73Y formed on the tubular member 71Y is conveyed in the internal space of the tubular member 71Y in a direction from the end at which the first reception port 73Y is formed toward the end at which the first supply port 74Y is formed of the tubular member 71Y, and falls from the first supply port 74Y.

The first toner storage 50Y includes a housing including an internal space for storing the toner. The housing extends in a rectangular tube shape in one direction and is arranged such that a longitudinal direction thereof is horizontal and parallel to the front-back direction. An opening 55Y that opens the internal space upward is formed on the housing. The internal space is communicated with the internal space of the first conveyance path 70Y via the opening 55Y and the first supply port 74Y The first toner storage 50Y includes a first supply motor 51Y, a first supply screw 52Y, two first stirring members 53Y and 54Y, and a first stirring motor 59Y The first supply screw 52Y includes a rotating shaft extending parallel to the front-back direction and a blade, which is a protrusion extending spirally from one end to the other end about an axial center of the rotating shaft. The first supply screw 52Y is arranged substantially at the center in the conveyance direction of the roll paper R at the bottom of the internal space of the housing.

Each of the two first stirring members 53Y and 54Y includes a rotating shaft extending parallel to the front-back direction and a plurality of stirring plates. The plurality of stirring plates is dispersedly arranged in a rotating shaft direction and extends in a plate shape perpendicularly from the rotating shaft. A plurality of holes is formed on the plurality of stirring plates.

Each of the two first stirring members 53Y and 54Y is arranged above the first supply screw 52Y such that the rotating shaft thereof is parallel to the rotating shaft of the first supply screw 52Y The two first stirring members 53Y and 54Y are arranged with the first supply screw 52Y interposed therebetween in plan view.

In the housing of the first toner storage 50Y, an inner surface of a bottom thereof has a shape in which parts of side surfaces of three cylinders are arranged in parallel. In the housing of the first toner storage 50Y, in a cross section in a plane parallel to the conveyance direction of the roll paper R, the inner surface of the bottom includes a part of a circle centered on the rotating shaft of the first supply screw 52Y and parts of circles centered on the rotating shafts of the two first stirring members 53Y and 54Y, respectively.

At the bottom of the housing of the first toner storage 50Y, the first discharge port 58Y that opens the internal space thereof downward is formed at an end on a back side. The first discharge port 58Y overlaps with a part of the first supply screw 52Y in plan view.

The first supply screw 52Y is connected to the first supply motor 51Y via a gear, and a rotational force of the first supply motor 51Y is transmitted to the first supply screw 52Y. Each of the two first stirring members 53Y and 54Y is connected to the first stirring motor 59Y via a gear, and a rotational force of the first stirring motor 59Y is transmitted to the first stirring members 53Y and 54Y The two first stirring members 53Y and 54Y rotate in different directions.

When the two first stirring members 53Y and 54Y are rotated by the first stirring motor 59Y, the toner stored in the internal space of the first toner storage 50Y is stirred by the two first stirring members 53Y and 54Y. When the first supply screw 52Y is rotated by the first supply motor 51Y, the toner in the vicinity of the bottom of the internal space out of the toner stored in the internal space of the first toner storage 50Y is conveyed in a direction from the front toward the back and falls from the first discharge port 58Y.

The first supply motor 51Y and the first stirring motor 59Y are DC motors. Therefore, a cost of the first supply motor 51Y and the first stirring motor 59Y can be reduced.

The second conveyance path 80Y conveys the toner supplied from the first toner storage 50Y to the second toner storage 60Y The second conveyance path 80Y includes a tubular member 81Y, a second conveyance screw 82Y, and a second conveyance motor 85Y. The second conveyance motor 85Y is a DC motor. Therefore, a cost of the second conveyance motor 85Y can be reduced. The tubular member 81Y has a shape extending in a tube shape in the conveyance direction of the roll paper R and in an upward direction and includes one end arranged below the first toner storage 50Y and the other end positioned above the second toner storage 60Y On the tubular member 81Y, a second reception port 83Y is formed as an opening that opens an internal space thereof upward at a lower position facing the first discharge port 58Y formed on the housing of the first toner storage 50Y Therefore, the first discharge port 58Y and the second reception port 83Y overlap with each other in plan view. A gap is formed between the first discharge port 58Y formed on the housing of the first toner storage 50Y and the second reception port 83Y formed on the tubular member 81Y On the tubular member 81Y, a second supply port 84Y, which is an opening that opens the internal space thereof downward, is formed at an end on a side opposite to the end at which the second reception port 83Y is formed.

The second conveyance screw 82Y includes a rotating shaft extending in one direction and a blade, which is a protrusion extending spirally from one end to the other end about an axial center of the rotating shaft. The second conveyance screw 82Y is rotatably stored in the internal space of the tubular member 81Y such that the axial center thereof overlaps with an axial center of the tubular member 81Y. An outer diameter of the second conveyance screw 82Y is the same as or slightly smaller than an inner diameter of the tubular member 81Y. The second conveyance screw 82Y is connected to a second conveyance motor 85Y via a gear, and a rotational force of the second conveyance motor 85Y is transmitted to the second conveyance screw 82Y.

When the second conveyance screw 82Y is rotated by the second conveyance motor 85Y, the toner received from the second reception port 83Y formed on the tubular member 81Y is conveyed in the internal space of the tubular member 81Y in a direction from the end at which the second reception port 83Y is formed toward the end at which the second supply port 84Y is formed of the tubular member 81Y, and falls from the second supply port 84Y.

Figure 6:
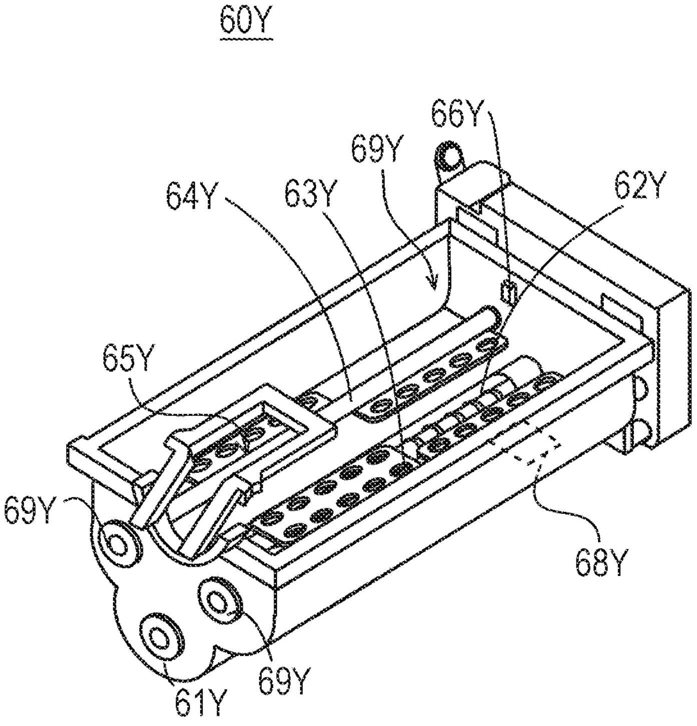
FIG. 6 is a perspective view of a second toner storage.

FIG. 6 is a perspective view of the second toner storage. With reference to FIGS. 2, 3, and 6, the second toner storage 60Y includes a housing including an internal space in which the toner is stored having a rectangular shape elongated in one direction in plan view. An opening 65Y that opens the internal space upward is formed on the housing. The internal space is communicated with the internal space of the second conveyance path 80Y via the opening 65Y and the second supply port 84Y In this embodiment, the second toner storage 60Y is arranged such that a longitudinal direction thereof is parallel to the conveyance direction of the roll paper R. The second toner storage 60Y includes a second supply motor 61Y, a second supply screw 62Y, and two second stirring members 63Y and 64Y The second supply screw 62Y includes a rotating shaft extending parallel to the longitudinal direction of the internal space and a blade, which is a protrusion extending spirally from one end to the other end about an axial center of the rotating shaft. The second supply screw 62Y is arranged substantially at the center in the front-back direction at the bottom of the internal space.

Each of the two second stirring members 63Y and 64Y includes a rotating shaft extending parallel to the longitudinal direction of the internal space and a plurality of stirring plates. The plurality of stirring plates is dispersedly arranged in a rotating shaft direction and extends in a plate shape perpendicularly from the rotating shaft. A plurality of holes is formed on the plurality of stirring plates.

Each of the two second stirring members 63Y and 64Y is arranged above the second supply screw 62Y such that the rotating shaft thereof is parallel to the rotating shaft of the second supply screw 62Y The two second stirring members 63Y and 64Y are arranged with the second supply screw 62Y interposed therebetween in plan view.

In the housing of the second toner storage 60Y, an inner surface of a bottom thereof has a shape in which parts of side surfaces of three cylinders are arranged in parallel. In the housing of the second toner storage 60Y, in a cross section in a plane perpendicular to the conveyance direction of the roll paper R, the inner surface of the bottom includes a part of a circle centered on the rotating shaft of the second supply screw 62Y and parts of circles centered on the rotating shafts of the two second stirring members 63Y and 64Y, respectively.

At the bottom of the housing of the second toner storage 60Y, the second discharge port 68Y that opens the internal space thereof downward is formed at the end on the side opposite to the opening 65Y in the conveyance direction of the roll paper R. The second discharge port 68Y overlaps with a part of the second supply screw 62Y in plan view.

A reception port 211Y, which is an opening that opens the internal space outward, is formed on the developing device 21Y The second discharge port 68Y overlaps with the reception port 211Y formed on the developing device 21Y in plan view. A gap is formed between the second discharge port 68Y and the reception port 211Y below the second discharge port 68Y The toner discharged from the second discharge port 68Y enters the internal space of the developing device 21Y from the reception port 211Y via the gap. The gap between the second discharge port 68Y and the reception port 211Y is a toner conveyance path.

The second supply screw 62Y is connected to the second supply motor 61Y via a gear, and a rotational force of the second supply motor 61Y is transmitted to the second supply screw 62Y Each of the two second stirring members 63Y and 64Y is connected to the second stirring motor 69Y via a gear, and a rotational force of the second stirring motor 69Y is transmitted to the second stirring members 63Y and 64Y. The two second stirring members 63Y and 64Y rotate in different directions.

When the two second stirring members 63Y and 64Y are rotated by the second stirring motor 69Y, the toner stored in the internal space of the second toner storage 60Y is stirred by the two second stirring members 63Y and 64Y When the second supply screw 62Y is rotated by the second supply motor 61Y, the toner in the vicinity of the bottom of the internal space out of the toner stored in the internal space of the second toner storage 60Y is conveyed in the conveyance direction of the roll paper R by the second supply screw 62Y and falls from the second discharge port 68Y to the developing device 21Y.

The second supply motor 61Y is a stepping motor. Therefore, a rotation amount of the second supply screw 62Y can be adjusted by controlling a rotation amount of the second supply motor 61Y, so that an amount of toner falling into the developing device 21Y can be accurately adjusted. The second stirring motor 69Y is a DC motor. Therefore, a cost of the second stirring motor 69Y can be reduced.

In this embodiment, a toner capacity storable in the first toner storage 50Y is larger than a toner capacity storable in the second toner storage 60Y. The toner capacity is a weight of the toner storable in the internal space. The toner capacity storable in the second toner storage 60Y is equal to or larger than a toner capacity storable in the developing device 21Y. Therefore, even in a case where the toner is rapidly consumed in the developing device 21Y, an appropriate amount of toner can be supplied to the developing device 21Y, and toner density in the developing device 21Y can be maintained constant. The toner capacity storable in the first toner storage 50Y is equal to or larger than 10% of a toner capacity storable in the toner bottle 30Y. More preferably, the toner capacity storable in the first toner storage 50Y is equal to or larger than 50% of the toner capacity storable in the toner bottle 30Y. Therefore, the internal space of the image forming apparatus 1 does not become too large and can be effectively used. It is possible to secure a sufficient time for replacing the toner bottle 30Y with a new toner bottle 30Y after the toner bottle 30Y becomes empty.

The toner capacity storable in the first toner storage 50Y may be a capacity with which it is possible to continuously print on the roll paper R of 1,000 m or longer at a predetermined printing rate in the developing device 21Y The printing rate is a ratio of an area in which the toner image is formed per unit area. In a case where there is a plurality of types of roll paper R having different widths, the toner capacity storable in the first toner storage 50Y is determined based on the roll paper R having the maximum width. Since the amount of toner consumed per unit area can be calculated from the printing rate, the toner capacity storable in the first toner storage 50Y is obtained from the area determined by the width of the roll paper R and the length of the roll paper R and a toner consumption amount per unit area. The predetermined printing rate is preferably 15%. Furthermore, the total toner capacity storable in the toner bottle 30Y, the first toner storage 50Y, and the second toner storage 60Y is preferably a capacity with which it is possible to print on continuous paper by 3,000 m or longer.

In order to keep the toner density in the developing device 21Y constant, it is necessary to accurately and precisely supply the toner of an amount corresponding to the amount of toner consumed in the developing device 21Y to the developing device 21Y. In this embodiment, the amount of toner to be supplied to the developing device 21Y can be accurately adjusted by using a stepping motor capable of controlling with high accuracy as the second supply motor 61Y included in the second toner storage 60Y arranged immediately before the developing device 21Y The first toner storage 50Y on an upstream side of the second toner storage 60Y has a larger toner storage amount than that of the second toner storage 60. Therefore, the first supply motor 51Y included in the first toner storage 50Y is a DC motor. The DC motor has a larger torque than that of the stepping motor. By using the DC motor (other than the stepping motor) as the first supply motor 51Y, the driving can be stably controlled even in a case where a load is large. Since the first toner storage 50Y and the second toner storage 60Y share their roles, it is possible to achieve both maintenance in image quality and productivity with roll paper.

<Toner Conveyance Control>

With reference to FIGS. 3 and 5, the first toner storage 50Y includes an upper limit sensor 56Y and a lower limit sensor 57Y in the internal space. The upper limit sensor 56Y is arranged above the lower limit sensor 57Y. The lower limit sensor 57Y is arranged at the same height as an upper surface of the toner in a state in which the toner of half the toner amount storable in the first toner storage 50Y is stored in the first toner storage 50Y As a result, it is possible to detect that the toner stored in the first toner storage 50Y is half from an output of the lower limit sensor 57Y The upper limit sensor 56Y and the lower limit sensor 57Y output an ON signal to the controller 90 when detecting the toner and output an OFF signal to the controller 90 while the toner is not detected. The upper limit sensor 56Y and the lower limit sensor 57Y are, for example, piezoelectric elements. Therefore, while the upper limit sensor 56Y outputs the ON signal, the lower limit sensor 57Y outputs the ON signal. While the upper limit sensor 56Y outputs the OFF signal, the lower limit sensor 57Y outputs the ON signal or the OFF signal.

With reference to FIGS. 3 and 6, the second toner storage 60Y includes a toner sensor 66Y in the internal space. The toner sensor 66Y outputs an ON signal to the controller 90 when detecting the toner, and outputs an OFF signal to the controller 90 while the toner is not detected. The toner sensor 66Y is, for example, a piezoelectric element.

The developing device 21Y stores a developer including a carrier and toner. Atoner density sensor SEY (refer to FIG. 2) is arranged in a space in which the developer is stored of the developing device 21Y The toner density sensor SEY detects the toner density of the developer. The toner density is a ratio of the toner to the carrier.

The controller 90 controls the bottle storage 40Y, the first toner storage 50Y, the second toner storage 60Y, the first conveyance path 70Y, and the second conveyance path 80Y, and adjusts the amount of toner stored in the developing device 21Y to be appropriate.

The controller 90 controls the bottle storage 40Y and the first conveyance path 70Y based on the outputs of the upper limit sensor 56Y and the lower limit sensor 57Y and adjusts the amount of toner stored in the first toner storage 50Y to be appropriate. Processing in which the controller 90 controls the bottle storage 40Y and the first conveyance path 70Y is referred to as first control processing. The controller 90 controls the first toner storage 50Y and the second conveyance path 80Y based on the output of the toner sensor 66Y and adjusts the amount of toner stored in the second toner storage 60Y to be appropriate. Processing in which the controller 90 controls the first toner storage 50Y and the second conveyance path 80Y is referred to as second control processing. The controller 90 controls the second toner storage 60Y based on the output of the toner density sensor SEY included in the developing device 21Y and adjusts the density of toner stored in the developing device 21Y to be appropriate. Processing in which the controller 90 controls the second toner storage 60Y is referred to as third control processing.

The controller 90 executes the first control processing, the second control processing, and the third control processing while executing the job received from the outside. In other words, the controller 90 can execute processing of executing the job received from the outside, the first control processing, the second control processing, and the third control processing in parallel.

Figure 7:
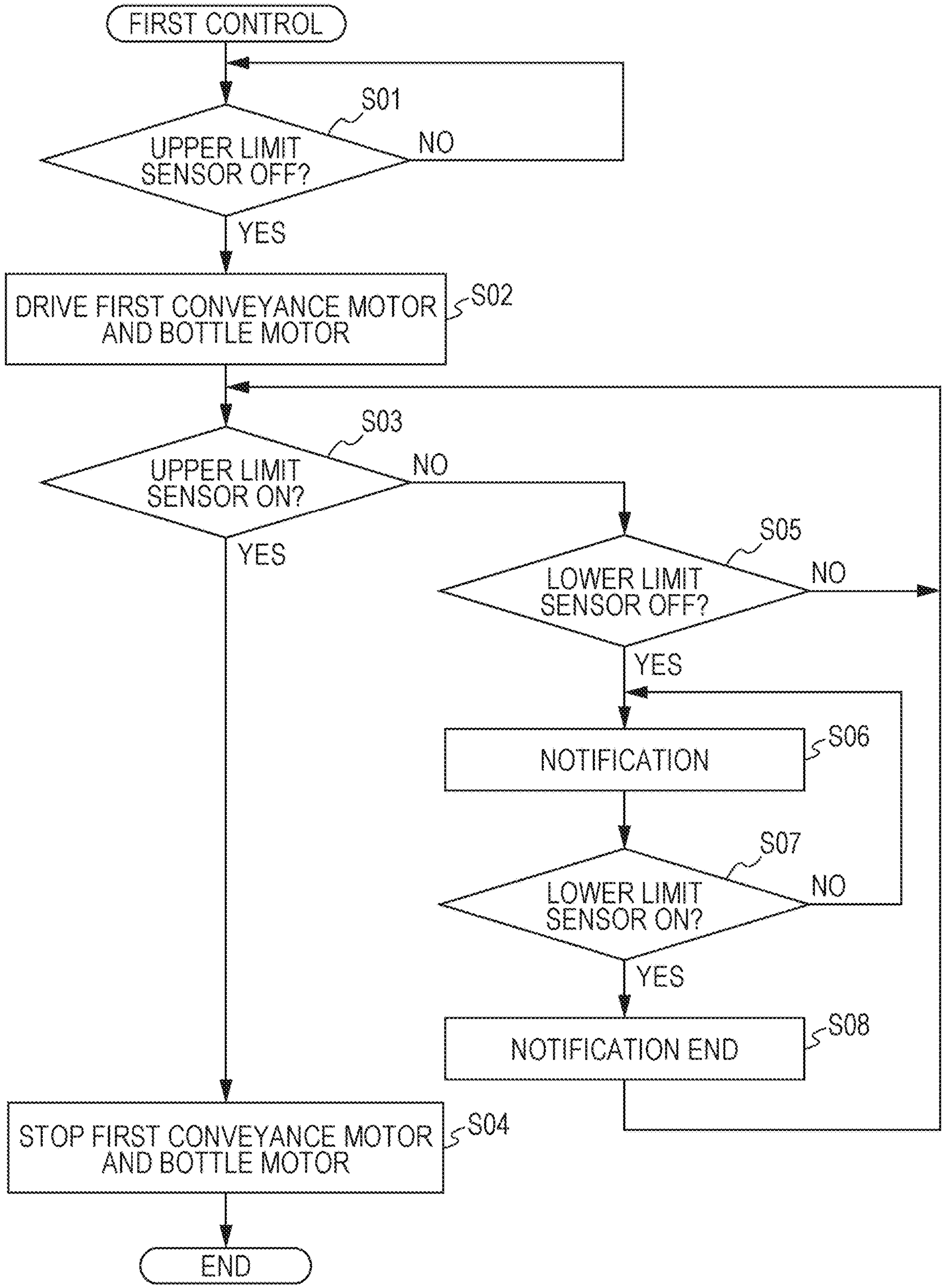
FIG. 7 is a flowchart illustrating an example of a flow of first control processing.

FIG. 7 is a flowchart illustrating an example of a flow of the first control processing. The first control processing is processing executed by the controller 90 when the CPU included in the controller 90 executes a control program stored in the memory. With reference to FIG. 7, the controller 90 determines whether the output of the upper limit sensor 56Y changes from the ON signal to the OFF signal (step S01). While the upper limit sensor 56Y outputs the ON signal, a standby state is set (NO at step S01), and when the upper limit sensor 56Y outputs the OFF signal (YES at step S01), the processing shifts to step S02.

At step S02, the first conveyance motor 75Y and the bottle motor 42Y are driven, and the processing shifts to step S03. As a result, the toner bottle 30Y rotates, so that the toner is supplied from the toner bottle 30Y to the first conveyance path 70Y Since the first conveyance screw 72Y rotates, the toner supplied from the toner bottle 30Y to the first conveyance path 70Y is conveyed by the first conveyance screw 72Y to be supplied to the first toner storage 50Y.

At step S03, it is determined whether the output of the upper limit sensor 56Y changes from the OFF signal to the ON signal. When the ON signal is output from the upper limit sensor 56Y, the processing shifts to step S04, and otherwise, the processing shifts to step S05. While the OFF signal is output from the upper limit sensor 56Y, the processing shifts to step S05.

At step S04, the first conveyance motor 75Y and the bottle motor 42Y are stopped, and the processing ends. As a result, the toner bottle 30Y stops rotating, so that the toner is no more supplied from the toner bottle 30Y to the first conveyance path 70Y, and the first conveyance screw 72Y stops rotating, so that the toner is no more supplied to the first toner storage 50Y. Therefore, the toner stored in the first toner storage 50Y is kept at a height equal to or higher than the height at which the upper limit sensor 56Y is installed.

At step S05, it is determined whether the output of the lower limit sensor 57Y changes from the ON signal to the OFF signal. When the OFF signal is output from the lower limit sensor 57Y (YES at step S05), the processing shifts to step S06, and otherwise, the processing returns to step S03. In a case where the ON signal is output from the lower limit sensor 57Y while the OFF signal is output from the upper limit sensor 56Y, the toner stored in the first toner storage 50Y is half or more. In this case, the processing returns to step S03, and the first conveyance motor 75Y and the bottle motor 42Y are continuously driven until the upper limit sensor 56Y outputs the ON signal.

In contrast, in a case where the OFF signal is output from the lower limit sensor 57Y while the OFF signal is output from the upper limit sensor 56Y, the toner stored in the first toner storage 50Y is less than half. In this case, the processing shifts to step S06.

At step S06, notification is made that the toner bottle 30Y becomes empty and that the amount of toner stored in the first toner storage 50Y is half or less. For example, a message prompting replacement of the toner bottle 30Y and a message indicating that the amount of toner stored in the first toner storage 50Y is half or less are displayed on a display device included in the image forming apparatus 1. Sound may be generated from a speaker. For example, the message may be output by voice. Notification may be made by light by causing an LED and the like to emit light.

At subsequent step S07, it is determined whether the output of the lower limit sensor 57Y changes from the OFF signal to the ON signal. When the ON signal is output from the lower limit sensor 57Y (YES at step S07), the processing shifts to step S08, and otherwise, the processing returns to step S06. At step S08, the controller 90 ends the notification and the procedure returns to step S03. A case where the output of the lower limit sensor 57Y changes from the OFF signal to the ON signal is a case where the amount of toner stored in the first toner storage 50Y increases. In this case, the toner is supplied from the toner bottle 30Y, so that the first conveyance motor 75Y and the bottle motor 42Y are continuously driven until the upper limit sensor 56Y outputs the ON signal. In contrast, in a case where the output of the lower limit sensor 57Y does not change from the OFF signal to the ON signal, the notification is continued. Since the toner is continuously consumed by the developing device 21Y, if the toner bottle 30Y is not replaced, the toner stored in the first toner storage 50Y decreases. A time for replacing the toner bottle 30Y is secured by a period until entire toner stored in the first toner storage 50Y is consumed by the developing device 21Y.

Figure 8:
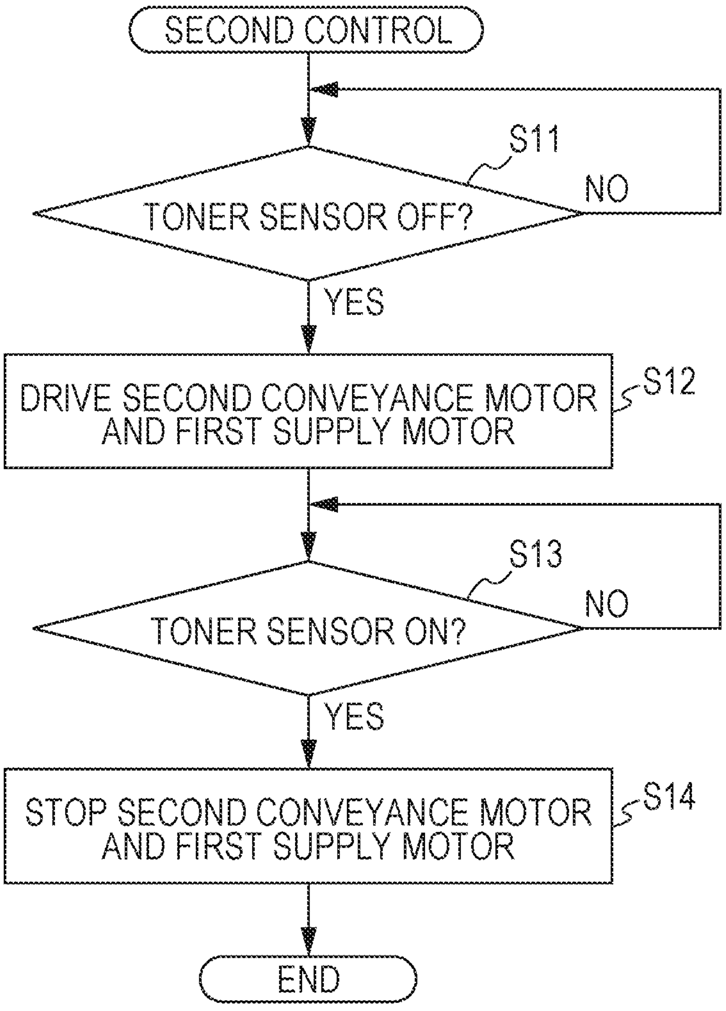
FIG. 8 is a flowchart illustrating an example of a flow of second control processing.

FIG. 8 is a flowchart illustrating an example of a flow of the second control processing. The second control processing is processing executed by the controller 90 when the CPU included in the controller 90 executes a control program stored in the memory. With reference to FIG. 8, the controller 90 determines whether the output of the toner sensor 66Y changes from the ON signal to the OFF signal (step S11). While the toner sensor 66Y outputs the ON signal, a standby state is set (NO at step S11), and when the toner sensor 66Y outputs the OFF signal (YES at step S11), the processing shifts to step S12.

At step S12, the second conveyance motor 85Y and the first supply motor 51Y are driven, and the processing shifts to step S13. As a result, the first supply screw 52Y rotates, so that the toner is supplied from the first toner storage 50Y to the second conveyance path 80Y. The second conveyance screw 82Y rotates, so that the toner supplied from the first toner storage 50Y to the second conveyance path 80Y is supplied to the second toner storage 60Y.

At step S13, it is determined whether the output of the toner sensor 66Y changes from the OFF signal to the ON signal. When the ON signal is output from the toner sensor 66Y, the processing shifts to step S14, and otherwise, the processing returns to step S13. While the OFF signal is output from the toner sensor 66Y, the second conveyance motor 85Y and the first supply motor 51Y are continuously driven.

At step S14, the second conveyance motor 85Y and the first supply motor 51Y are stopped, and the processing ends. As a result, the first supply screw 52Y stops rotating, so that the toner is no more supplied from the first toner storage 50Y to the second conveyance path 80Y, and the second conveyance screw 82Y stops rotating, so that the toner is no more supplied to the second toner storage 60Y. Therefore, the toner stored in the second toner storage 60Y is kept at a height equal to or higher than the height at which the toner sensor 66Y is installed.

Figure 9:
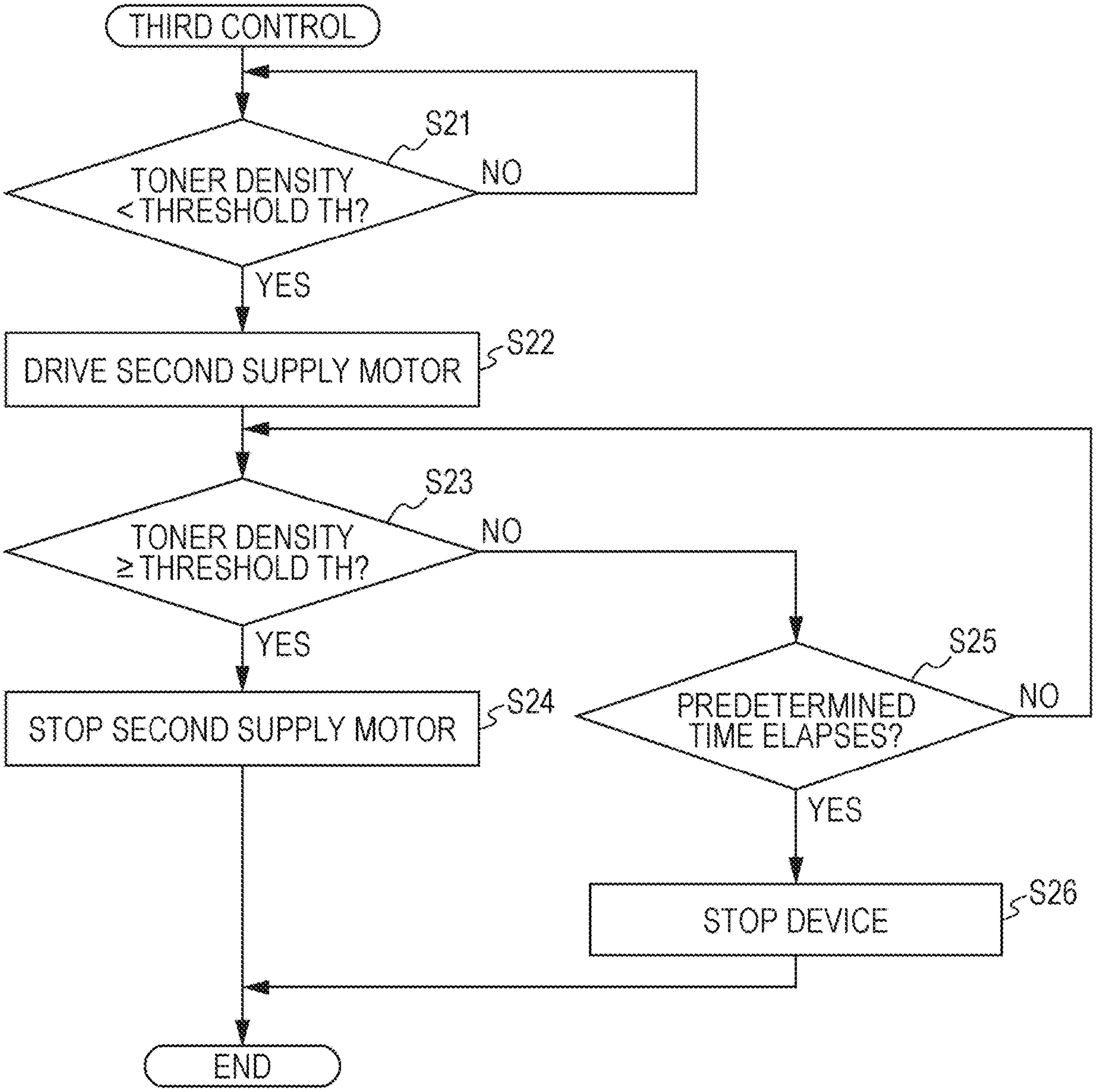
FIG. 9 is a flowchart illustrating an example of a flow of third control processing.

FIG. 9 is a flowchart illustrating an example of a flow of the third control processing. The third control processing is processing executed by the controller 90 when the CPU included in the controller 90 executes a control program stored in the memory. With reference to FIG. 9, the controller 90 compares the toner density with a threshold TH (step S21). The toner density is detected based on an output value of the toner density sensor SEY. When the toner density is equal to or larger than the threshold TH, a standby state is set (NO at step S21), and when the toner density is smaller than the threshold TH (YES at step S21), the processing shifts to step S22. In a case where the toner density is smaller than the threshold TH, the amount of toner stored in the developing device 21Y is smaller than a target toner amount.

At step S22, the second supply motor 61Y is driven, and the processing shifts to step S23. As a result, the second supply screw 62Y rotates, so that the toner is supplied from the second toner storage 60Y to the developing device 21Y.

At step S23, the toner density is compared with the threshold TH. When the toner density is smaller than the threshold TH, the processing shifts to step S25, and when the toner density is equal to or larger than the threshold TH, the processing shifts to step S24. While the toner density is smaller than the threshold TH, the second supply motor 61Y is continuously driven.

At step S24, the second supply motor 61Y is stopped, and the processing ends. As a result, the second supply screw 62Y stops rotating, so that the toner is no more supplied from the second toner storage 60Y to the developing device 21Y. Therefore, the toner density of the developer stored in the developing device 21Y is kept constant.

At step S25, it is determined whether a predetermined time elapses since it is determined that the toner density is smaller than the threshold TH. When a predetermined time elapses, the processing shifts to step S26, and otherwise, the processing returns to step S23. At step S26, driving of the image former IM is stopped, and the processing ends. A case where a predetermined time elapses after the toner density is determined to be smaller than the threshold TH is a case where the toner is not supplied from the first toner storage 50Y to the second toner storage 60Y Since this case corresponds to a case where the toner bottle 30Y is not replaced, the image former IM is stopped so that an image forming operation is not executed in a state in which there is no toner in the second toner storage 60Y.

As described above, the image forming apparatus 1 according to this embodiment can form the toner image on the roll paper R, which is continuous paper. The image forming apparatus 1 includes the developing device 21Y that develops the latent image formed on the photosensitive drum 22Y to form the toner image, the toner bottle 30Y that stores the toner and is detachably attached to the main body 11, and the first toner storage 50Y and the second toner storage 60Y, and the toner is supplied from the toner bottle 30Y to the developing device 21Y via the first toner storage 50Y and the second toner storage 60Y. Therefore, even in a state in which the toner stored in the toner bottle 30Y runs out, the toner is stored in the first toner storage 50Y and the second toner storage 60Y Even in a state in which the toner stored in the toner bottle 30Y runs out, the toner stored in the first toner storage 50Y and the second toner storage 60Y is supplied to the developing device 21Y, so that the toner image can be continuously formed on the roll paper R. Therefore, it is possible to secure a time for replacing the toner bottle 30Y with a new toner bottle 30Y after the toner in the toner bottle 30Y runs out. Therefore, it is not necessary to increase a size of the toner bottle 30Y. The toner image can be continuously formed on the roll paper R without stopping the image forming operation.

The toner capacity of the first toner storage 50Y is larger than the toner capacity of the second toner storage 60Y Therefore, a size of the second toner storage 60Y can be reduced, and space saving, and power saving can be achieved. The toner storage amount in the entire image forming apparatus 1 can be improved, and the toner can be accurately supplied to the developing device 21Y in order to maintain the toner density of the developing device 21Y.

The toner is supplied from the first toner storage 50Y on the upstream side to the developing device 21Y via the second toner storage 60Y on the downstream side. Therefore, the direction in which the toner is conveyed is one direction, so that the path through which the toner is conveyed can be shortened.

The first toner storage 50Y on the upstream side stores the toner supplied from the toner bottle 30Y, and the second toner storage 60Y on the downstream side stores the tonner conveyed from the first toner storage 50Y on the upstream side and supplies the toner to the developing device 21Y according to the toner density in the developing device 21Y. Therefore, even when the toner bottle 30Y becomes empty, the first toner storage 50Y can supply the toner to the second toner storage 60Y Even when the first toner storage 50Y becomes empty, the second toner storage 60Y can supply the toner to the developing device 21Y Therefore, it is possible to secure a time from when the toner bottle 30Y becomes empty until the second toner storage 60Y becomes unable to supply the toner to the developing device 21Y.

Each of the first toner storage 50Y and the second toner storage 60Y may store the toner supplied from the outside during the job and may convey the toner to the outside during the job. Therefore, the toner is supplied from the toner bottle 30Y to the developing device 21Y while the job defining processing of forming the toner image on the roll paper R is being executed in the image forming apparatus 1. Therefore, the toner image can be formed on the roll paper R without interrupting the job.

The second toner storage 60Y on the upstream side of the developing device 21Y has the toner capacity equal to or larger than the toner capacity of the developing device 21Y. Therefore, even in a case where the toner is rapidly consumed in the developing device 21Y, an appropriate amount of toner can be supplied to the developing device 21Y, and toner density in the developing device 21Y can be maintained constant.

A value obtained by summing up the toner capacities of the first toner storage 50Y and the second toner storage 60Y is equal to or larger than the toner capacity of the developing device 21Y Therefore, it is possible to secure a time for replacing the toner bottle 30Y while maintaining the toner density in the developing device 21Y constant.

The first toner storage 50Y and the second toner storage 60Y have different driving sources. The toner is independently supplied in each of the first toner storage 50Y and the second toner storage 60Y Therefore, the control of supplying the toner in each of the first toner storage 50Y and the second toner storage 60Y may be made different.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus capable of forming a toner image on continuous paper, the image forming apparatus comprising:

- a developing device that is configured to develop a latent image formed on an image carrier to form a toner image;
- a toner storage container configured to store toner, the toner storage container arranged to be attachable to and detachable from the image forming apparatus, and is configured to be replenished with toner during an image forming operation; and
- a plurality of toner storages, wherein
  - the toner is supplied from the toner storage container to the developing device from an upstream toner storage to a downstream toner storage among the plurality of toner storages;
  - the toner storage container is configured to be replaced while a toner image is continuously formed; and
- wherein a second driving force provided in a toner storage on a most downstream side of the plurality of toner storages is configured to perform toner supply control with higher accuracy than a first driving force provided in a toner storage on an upstream side of the toner storages on the most downstream side.

2. The image forming apparatus according to claim 1, wherein

- the plurality of toner storages includes a first toner storage and a second toner storage, and
- a toner capacity of the first toner storage is larger than a toner capacity of the second toner storage.

3. The image forming apparatus according to claim 1, wherein

- the toner is supplied from a toner storage on an upstream side out of the plurality of toner storages via a toner storage on a downstream side to the developing device.

4. The image forming apparatus according to claim 3, wherein

- the toner storage on the upstream side has a larger toner capacity than a toner capacity of the toner storage on the downstream side.

5. The image forming apparatus according to claim 3, wherein

- the toner storage on the upstream side stores the toner supplied from the toner storage container, and
- the toner storage on the downstream side stores the toner conveyed from the toner storage on the upstream side and supplies the toner to the developing device according to toner density in the developing device.

6. The image forming apparatus according to claim 1, wherein

- each of the plurality of toner storages is capable of storing the toner supplied from outside during a job and is capable of conveying the toner to the outside during the job.

7. The image forming apparatus according to claim 3, wherein

- the toner storage on the downstream side out of the plurality of toner storages has the toner capacity equal to or larger than a toner capacity of the developing device.

8. The image forming apparatus according to claim 1, wherein

- a value obtained by summing up toner capacities of the plurality of toner storages is equal to or larger than a toner capacity of the developing device.

9. The image forming apparatus according to claim 2, wherein

- the toner capacity is a weight of toner storable in a space.

10. The image forming apparatus according to claim 3, wherein

- the developing device is connected to a toner storage on a most downstream side out of the plurality of toner storages via a toner conveyance path.

11. The image forming apparatus according to claim 3, wherein

- a driving source of a toner storage on a most downstream side out of the plurality of toner storages and a driving source of a toner storage on an upstream side of the toner storage on the most downstream side are different from each other.

12. The image forming apparatus according to claim 11, wherein

- the driving source of the toner storage on the most downstream side out of the plurality of toner storages is a stepping motor, and
- the driving source of the toner storage on the upstream side of the toner storage on the most downstream side out of the plurality of toner storages is a motor other than the stepping motor.

13. The image forming apparatus according to claim 11, wherein the toner storage on the most downstream side includes a first toner conveying mechanism and a first toner stirring mechanism, and a driving source of at least the first toner conveying mechanism is a stepping motor.

14. The image forming apparatus according to claim 11, wherein the toner storage on the upstream side of the toner storage on the most downstream side out of the plurality of toner storages includes a second toner conveying mechanism and a second toner stirring mechanism, and a driving source of the second toner conveying mechanism and the second toner stirring mechanism is a motor other than a stepping motor.

15. The image forming apparatus according to claim 12, wherein the motor other than the stepping motor is a DC motor.

16. The image forming apparatus according to claim 1, wherein each of the plurality of toner storages includes a sensor for detecting an amount of the toner to be stored, and the number of sensors or a detection criterion of the toner amount are different between the toner storage on the most downstream side and the toner storage on the upstream side out of the plurality of toner storages.

17. The image forming apparatus of claim 1, wherein the image forming apparatus is configured to form toner images of a plurality of colors, and the image forming apparatus includes, for each of the colors, the developing device, the toner storage container, and the plurality of toner storage units.

* * * * *